(12) United States Patent
Nahas et al.

(10) Patent No.: US 6,776,607 B2
(45) Date of Patent: Aug. 17, 2004

(54) PROCESS FOR MINIMIZING AFTERBURN IN A FCC REGENERATOR

(75) Inventors: Nicholas C. Nahas, Chatham, NJ (US); Richard E. Walter, Long Valley, NJ (US); Dean C. Draemel, Kingwood, TX (US); Bruce J. Artuso, Chester, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 382 days.

(21) Appl. No.: 09/892,382

(22) Filed: Jun. 26, 2001

(65) Prior Publication Data

US 2002/0072465 A1 Jun. 13, 2002

Related U.S. Application Data

(60) Provisional application No. 60/213,911, filed on Jun. 26, 2000.

(51) Int. Cl.[7] .......................... F23J 15/00; B01J 38/06; B01J 38/30; B01J 38/36
(52) U.S. Cl. .............................. 431/5; 502/41; 502/42; 502/55
(58) Field of Search ................. 431/5; 502/41, 502/42, 55

(56) References Cited

U.S. PATENT DOCUMENTS

| | | | |
|---|---|---|---|
| 2,382,382 A | 8/1945 | Carlsmith et al. | 252/242 |
| 2,454,373 A | 11/1948 | Blanding | 252/242 |
| 2,454,466 A | 11/1948 | Le Roi | 252/242 |
| 3,903,016 A | 9/1975 | Owen | 252/417 |
| 4,036,779 A | 7/1977 | Schatz et al. | 252/417 |
| 4,051,069 A | 9/1977 | Bunn, Jr. et al. | 252/417 |
| 4,056,486 A | 11/1977 | Bunn, Jr. et al. | 252/417 |
| 4,173,527 A | 11/1979 | Heffley et al. | 208/153 |
| 4,180,454 A | 12/1979 | Luckenback | 208/113 |
| 5,156,817 A | 10/1992 | Luckenback | 422/144 |
| 5,773,378 A | 6/1998 | Bussey et al. | 502/141 |

*Primary Examiner*—Stanley S. Silverman
*Assistant Examiner*—Jonas N. Strickland
(74) *Attorney, Agent, or Firm*—Erika S. Wilson; Jeremy J. Kliebert

(57) ABSTRACT

The invention relates to a process and apparatus for controlling afterburning in the regenerator of a FCC unit. The process and apparatus inject steam into the dilute phase within a regenerator to promote combustion of carbon monoxide before it enters the regenerator cyclones, plenum, or flue gas transfer lines.

24 Claims, 2 Drawing Sheets

PROCESS FOR MINIMIZING AFTERBURN IN A FCC REGENERATOR

CROSS-REFERENCE TO RELATED APPLICATIONS

This patent application claims benefit of U.S. provisional patent application 60/213,911 filed Jun. 26, 2000.

BACKGROUND

The invention relates to a process and apparatus for controlling afterburning in the regenerator of a fluid catalytic cracking unit (FCCU).

Fluidized catalytic cracking (FCC) of conventional feeds may be accomplished by a variety of processes that employ fluidized solid techniques. Normally in such processes, the FCC feed contacts a cracking catalyst in a fluidized bed reaction zone or in an riser reaction zone.

During the cracking reaction, coke deposits on the catalyst particles in the reaction zone, thereby reducing the activity of the catalyst for cracking. To restore the activity of the spent catalyst, the catalyst is transferred from the reaction zone into a regeneration zone. A regeneration zone may comprise a large vertical substantially cylindrical vessel wherein the spent catalyst is maintained as a fluidized bed by the upward passage of an oxygen-containing regeneration gas, preferably air. The fluidized catalyst forms a dense phase catalyst bed in the lower portion of the vessel and a dilute phase in the upper portion of the vessel. The dilute phase contains entrained catalyst particles. The spent catalyst contacts the oxygen-containing regeneration gas under conditions sufficient to burn at least a portion of the coke from the catalyst. The flue gas exiting the regenerator comprises gases arising from the combustion of the coke on the spent catalyst, inert gases such as nitrogen from air, and unreacted oxygen. Before exiting the regenerator, the flue gas passes from the dilute phase into solid-gas separators within the regeneration zone (e.g., cyclone separators) to prevent excessive losses of the entrained catalyst particles. The catalyst particles separated from the flue gas return to the dense phase catalyst bed. The regenerated catalyst is subsequently recycled to the reaction zone.

Regenerators typically operate under either full-burn conditions or partial-burn conditions. Under full-burn conditions, the regenerator is designed to operate so that substantially all of the carbon monoxide (CO) in the regenerator gases combusts to form carbon dioxide ($CO_2$), thereby imparting the heat of reaction to the regeneration zone. Under partial-burn conditions, the regenerator is designed to operate so that only a portion of the CO combusts to $CO_2$, the remainder of the CO may be used in a combustion heat recovery boiler.

A problem associated with full burn regenerators is the incomplete combustion of the dilute phase gas CO to $CO_2$. The analogous problem with partial burn regenerators is incomplete consumption of $O_2$ in the dilute phase. Either problem gives rise to afterburning (CO combustion) in the cyclones, plenum, and flue gas transfer lines. The afterburning is exothermic, and the flue gas must absorb the heat of combustion, which decreases the amount of heat transferred to the catalyst bed. The maximum increase in the temperature allowed for the flue gas is generally governed by the temperature limits imposed by the materials of construction for the cyclones, plenum, and flue gas transfer lines. These limits require operators to maintain the catalyst bed at a lower temperature than desired to account for afterburning. The lower temperature in the catalyst bed ultimately limits the throughput to the FCCU.

A need exists for a process and/or apparatus to control afterburning in the dilute phase zone of the regenerator without reducing the throughput of the FCCU.

SUMMARY

One embodiment of the present invention comprises a process for controlling afterburn in a catalyst regenerator of a fluidized catalytic cracking unit. The regenerator comprises a catalyst bed and a dilute phase. The dilute phase is above the catalyst bed and below the inlets to the solid-gas separators. The dilute phase comprises (a) a first zone comprising oxygen (along with gases arising from the combustion of the coke on the spent catalyst and inert gases such as nitrogen from the air), wherein combustion in the first zone is fuel-limited; and (b) a second zone comprising carbon monoxide, wherein combustion in the second zone is oxygen-limited. The process comprises the step of injecting an effective amount of steam into said dilute phase to substantially mixing the gases from the first zone and the second zone so that a substantial portion of the carbon monoxide combusts before passing through the inlet to the solid-gas separator.

Another embodiment of the present invention comprises a process for regenerating spent catalyst from the reaction zone of a fluid catalytic cracking reactor and comprises the steps of: (a) passing spent catalyst from the reaction zone of a fluid catalytic cracking reactor to a regenerator wherein the regenerator has therein a fluidized catalyst bed and a dilute phase zone above the catalyst bed, wherein the dilute phase zone comprises the gases carbon monoxide and oxygen; (b) contacting the spent catalyst with a gas comprising oxygen to produce a regenerated catalyst; (c) passing the regenerated catalyst to the reaction zone; and, (d) mixing the gases present in the dilute phase zone by the injection of steam so that a substantial portion of the carbon monoxide present in the dilute phase zone combusts.

Another embodiment of the present invention comprises: in a fluid catalytic cracking unit, a catalyst regenerator comprising: (a) a vessel having a fluidized catalyst bed therein with a dilute phase zone positioned above the catalyst bed, wherein the dilute phase zone comprises (i) a first zone comprising carbon monoxide and oxygen, wherein combustion in the first zone is fuel-limited; (ii) a second zone comprising carbon monoxide and oxygen, wherein combustion in the second zone is oxygen-limited; and, (b) at least one steam inlet positioned to inject steam into the dilute phase zone of the vessel to substantially mix the gases of the first and second zones without substantially disturbing the catalyst bed.

Another embodiment of the present invention comprises a regenerator for use in conjunction with a fluid catalytic cracking unit comprising a vessel configured to have: (a) at least one internal bed section positioned near the lower end of the vessel, wherein the internal bed section is configured to hold a bed of catalyst; (b) a gas inlet positioned to allow an oxygen-containing gas to contact the bed of catalyst positioned within the vessel; (c) a spent catalyst inlet; (d) a regenerated catalyst outlet; (e) a flue gas outlet; (f) at least one solid-gas separator having an inlet disposed within the vessel, wherein the separator inlet is positioned above the internal bed section; and, (g) at least one steam inlet positioned between the internal bed section and the separator inlet, the steam inlet configured to inject an effective amount of steam at a rate sufficient to substantially mix gases present in the area between the internal bed section and the separator inlet without substantially disturbing the catalyst bed positioned in the internal bed section while the regenerator is in operation.

Another embodiment of the present invention comprises a process for regenerating spent catalyst from the reaction zone of a fluid catalytic cracking reactor comprising the steps of: (a) passing spent catalyst from the reaction zone of a fluid catalytic cracking reactor to a regenerator, the regenerator having therein a fluidized catalyst bed and a dilute phase zone above the catalyst bed, the dilute phase zone comprising the gases carbon monoxide and oxygen; the dilute phase zone comprising a zone wherein carbon monoxide combustion is oxygen limited; (b) contacting the spent catalyst with a gas comprising oxygen to produce a regenerated catalyst; (c) passing the regenerated catalyst to the reaction zone; and, (d) passing steam and an oxygen containing gas, preferably air, into the zone wherein carbon monoxide combustion is oxygen limited at a rate sufficient to combust a substantial portion of the carbon monoxide present in the zone wherein carbon monoxide combustion is oxygen limited.

Another embodiment of the present invention comprises a process for regenerating spent catalyst from the reaction zone of a fluid catalytic cracking reactor in a regenerator comprising the steps of (a) passing spent catalyst from the reaction zone of a fluid catalytic cracking reactor to a regenerator operating under partial burn conditions, the regenerator having therein a fluidized catalyst bed and a dilute phase zone above the catalyst bed, the dilute phase zone comprising the gases carbon monoxide and oxygen; (b) contacting the spent catalyst with a gas comprising oxygen to produce a regenerated catalyst; (c) passing the regenerated catalyst to the reaction zone; and, (d) injecting steam into said dilute phase to cause mixing of the gases present in the dilute phase zone so that substantially all of the oxygen present in the dilute phase is depleted by combustion with carbon monoxide.

Another embodiment of the present invention comprises a process for controlling afterburn in a catalyst regenerator of a fluidized catalytic cracking unit, the regenerator adapted to operate under partial burn conditions, the regenerator comprising a catalyst bed and a dilute phase, the dilute phase positioned above the catalyst bed and below an inlet to a solid-gas separator, the dilute phase comprising (a) a first zone comprising oxygen, wherein combustion in the first zone is fuel-limited; (b) a second zone comprising carbon monoxide, wherein combustion in the second zone is oxygen-limited, the process comprising the step of substantially mixing the gases from the first zone and the second zone by the injection of an effective amount of steam so that a substantial portion of the oxygen present in the dilute phase reacts with carbon monoxide before passing through the inlet to the solid-gas separator.

DETAILED DESCRIPTION OF THE INVENTION

Figure 1:
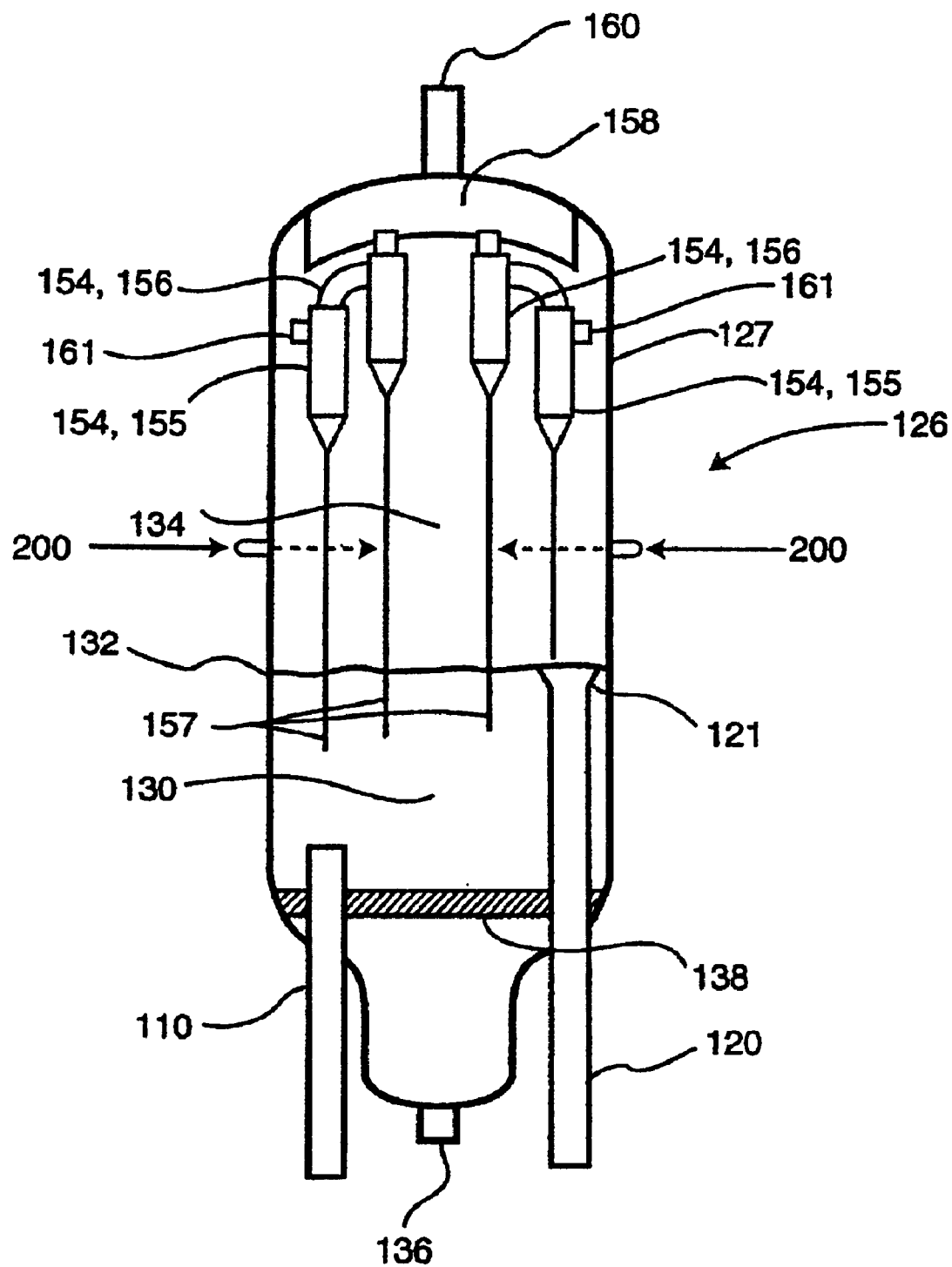
FIG. 1 illustrates an embodiment of a FCCU regenerator.

A maldistribution of CO and oxygen ($O_2$) can exist in the dilute phase of the FCCU regenerator. For example, viewing FIG. 1, (i) CO combustion above/near the spent catalyst inlet 110 is oxygen-limited, meaning that there may be an excess of fuel (CO) in the dilute phase 134 above the spent catalyst inlet 110; and (ii) CO combustion above the regenerated catalyst outlet 120/weir 121 in the dilute phase 134 is fuel (CO) limited, meaning there is an excess of $O_2$ in the zone above the regenerated catalyst outlet weir 121 in the dilute phase 134. When this maldistribution of gases are eventually mixed in the cyclones 154, 155, 156, plenum 158, and flue gas transfer line(s) 160, afterburning occurs because the uncombusted CO reacts with the $O_2$ to cause afterburning. The afterburning occurs because the CO and $O_2$ concentrations are no longer limiting factors.

By mixing the dilute phase gases from the zones positioned above the spent catalyst inlet 110 and above the regenerated catalyst outlet 120/weir 121 before the gases reach the cyclones, afterburning in the cyclones 154, 155, 156, plenum 158, and flue gas transfer line(s) 160 decreases, thus allowing more heat absorption by the dense catalyst bed 130 and greater throughput to the FCCU. A similar effect is achieved by injecting an oxygen-containing gas into the dilute phase 134 where combustion is oxygen-limited.

FCCU feeds typically include hydrocarbonaceous oils boiling in the range of about 430° F. to about 1050° F. (480–565° C.), such as gas oil, heavy hydrocarbon oils comprising materials boiling above 1050° F. (565° C.); heavy and reduced petroleum crude oil; petroleum atmospheric distillation bottoms; petroleum vacuum distillation bottoms; pitch, asphalt, bitumen, other heavy hydrocarbon residues; tar sand oils; shale oil; liquid products derived from coal liquefaction processes; and mixtures thereof. The FCC process of the present invention may be carried out in any type of fluid catalytic cracking unit without limitations as to the special arrangement of the reaction, stripping, and regeneration zones, etc. In general, the present invention can be used with conventional FCC processes and units regardless of the catalyst circulated in the FCCU. Typical catalysts used in FCC operations include large-pore zeolites, such as zeolite Y.

The FCC feed passes to a FCCU where it is injected into the reaction zone and contacts a catalyst. The hot catalyst vaporizes and cracks the FCC feed at a temperature from about 450° C. to about 650° C., preferably from about 500° C. to about 600° C. to form cracked products. The cracking reaction deposits coke on the catalyst, thereby deactivating the catalyst or reducing the catalytic activity. The cracked products may be separated from the coked catalyst and at least a portion of the cracked products may be conducted to a fractionator and on to further processing.

The coked catalyst passes into a stripping zone where a stripping agent, such as steam, strips volatiles (strippable hydrocarbons) from the catalyst particles. The stripping may be performed under low severity conditions in order to retain adsorbed hydrocarbons on the catalyst for heat balance. The stripped catalyst passes to the regeneration zone 126 where it is regenerated by burning coke on the catalyst in the presence of an oxygen-containing gas, preferably air. Decoking restores catalyst activity and simultaneously heats the catalyst to between 650° C. and 800° C. The hot catalyst is then recycled to the FCC reaction zone.

Regeneration zone 126 comprises a large cylindrical regeneration vessel 127 wherein the spent catalyst is maintained as a fluidized bed by passing an oxygen-containing regeneration gas, preferably air, up through the catalyst bed 130 via line 136 and distributor grid 138. The fluidized catalyst forms a dense phase, or catalyst bed 130, in the lower portion of the vessel 127 and a dilute phase 134 comprising entrained catalyst particles and gas between the upper level 132 of the catalyst bed 130 and the plenum 158 or the cyclone inlets 161. The catalyst contacts the oxygen-containing regeneration gas under conditions sufficient to burn at least a portion, preferably a major portion, of the coke from the catalyst. Spent regeneration gas and entrained catalyst pass via one or more solid gas separators 154 (a primary cyclone 155 and a secondary cyclone 156) before being recovered in the flue gas line 160 for disposal. The cyclones 155, 156 separate entrained catalyst particles and return them to the bed 130 via cyclone diplegs 157 to prevent excessive losses of the entrained catalyst particles. The flue gas passes into a plenum chamber 158 prior to discharge from the regeneration zone 126 through line 160. The regenerated catalyst is subsequently recycled to the reaction zone.

In the embodiment shown in FIG. 1, the regeneration zone is a vessel configured to have an internal bed section that holds the catalyst bed 130 during regeneration. The internal bed section is defined as the area below the top of the weir 121 of the regenerated catalyst outlet pipe 120, and preferably between the top of weir 121 and grid 138. The regeneration zone 126 is preferably in a separate vessel containing a dense phase catalyst bed 130 in the internal bed section and having a level indicated at 132 (indicated also by the upper end of weir 121) above that is a dilute phase 134. In other embodiments not shown, the regeneration zone 126 may be configured as part of the same vessel as the FCCU reactor. The catalyst in the dense phase catalyst bed 130 undergoes regeneration to burn off coke deposits formed in the reaction zone during the cracking reaction. An oxygen-containing regeneration gas enters the lower portion of regeneration zone 126 via line 136 and passes up through a grid 138 and the dense phase catalyst bed 130, maintaining bed 130 in a fluidized condition.

Oxygen-containing regeneration gases used in the process of the present invention are those gases that contain molecular oxygen that may be mixed with an inert diluent gas. Air is a particularly suitable regeneration gas. Alternatively, air enriched with oxygen may be employed. Additionally, if desired, steam may be added to the dense phase bed 130 along with the regeneration gas or separately therefrom to provide additional inert diluents and/or fluidization gas.

The dilute phase 134 above the catalyst bed 130 comprises entrained catalyst particles, oxygen, and carbon monoxide (along with gases arising from the combustion of the coke on the spent catalyst and inert gases such as nitrogen from the air). Viewing FIG. 2, in the embodiments of the present invention, the dilute phase 134 may be divided vertically (though not physically, see dotted line in FIG. 2) into a first zone I and a second zone II that may or may not overlap. Zone I is preferably located above the overflow weir 121, or entrance, to the regenerated catalyst outlet line 120, and zone II is preferably located above the spent catalyst inlet line 110. Carbon monoxide combustion above the spent catalyst inlet line 110 is $O_2$ limited, meaning that there is an excess of fuel (CO) in zone II above the spent catalyst inlet line 110. Carbon monoxide combustion above the regenerated catalyst outlet weir 121 is fuel (CO) limited, meaning there is an excess Of $O_2$ in zone I above the regenerate catalyst outlet weir 121.

One or more steam inlets 200 or injectors 200 are positioned to inject, or pass, steam either alone or with the addition of an oxygen-containing gas into the dilute phase 134 above the internal bed section and the catalyst bed 130. The additional oxygen-containing gas can be injected into the dilute phase either separately or mixed with steam to enhance the combustion of CO to $CO_2$. The preferred oxygen-containing gas is air. The steam and optionally oxygen-containing gas, preferably passes from a suitable source external from the unit. An effective amount of steam is injected at a rate to sufficiently mix the gas in zone I and the gas in zone II to promote substantial combustion of CO to $CO_2$.

As used herein, injection of steam/oxygen-containing gas may also include flashing a liquid into the dilute phase 134 so the flashed liquid (now in vapor phase) performs the same function as injection of steam. This may or may not be desirable because of the energy (heat) requirements needed for flashing.

Figure 2:
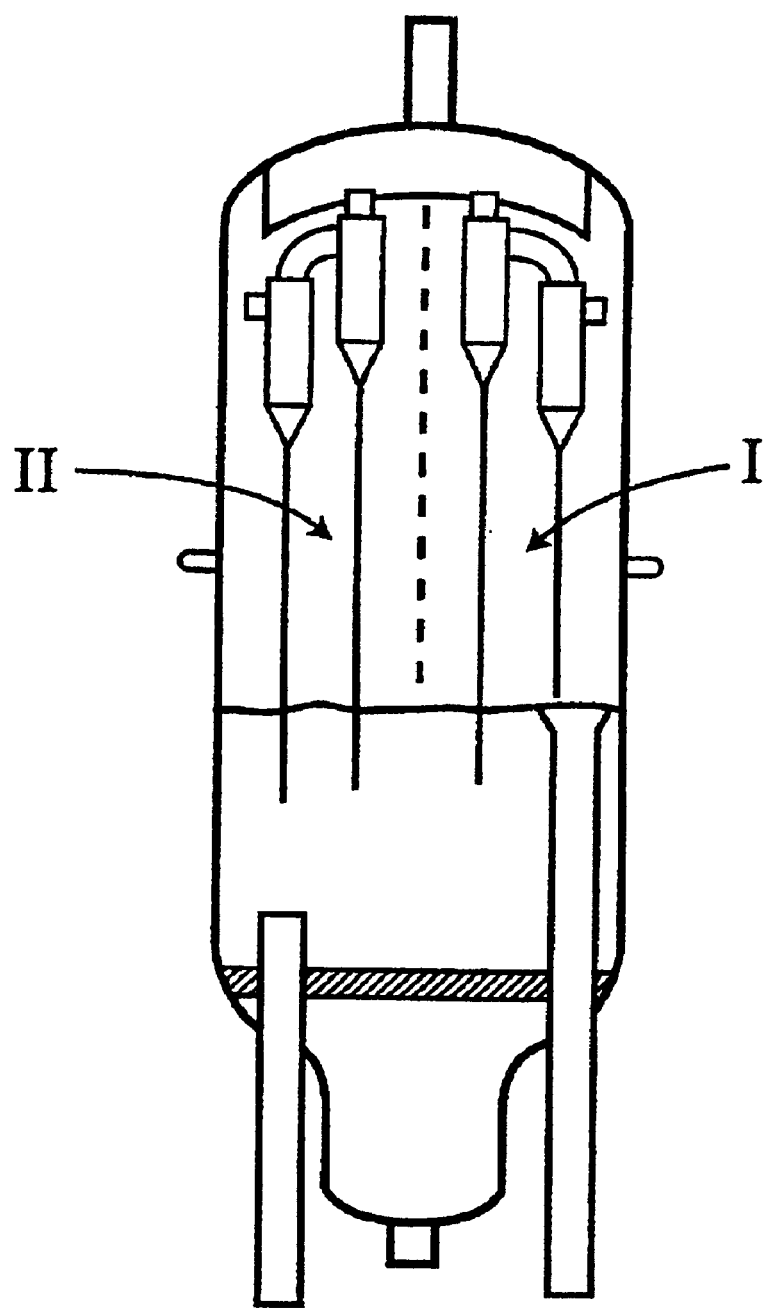
FIG. 2 illustrates the embodiment shown in FIG. 1 with the dilute phase divided into zones.

Alternatively, steam inlet 200 may be positioned to inject steam with or without an oxygen-containing gas only to the oxygen-limited zone (zone II in FIG. 2). In embodiments where an oxygen-containing gas is injected into the oxygen-limited zone, the oxygen-containing gas passes into the oxygen-limited zone at a rate sufficient to promote substantially complete combustion of the CO in the oxygen-limited zone. In such embodiments, the oxygen-containing gas may or may not be injected at a rate sufficient to substantially mix zones I and II as long as combustion of CO is substantially complete as discussed below. These embodiments may be desirable for full-burn units where excess oxygen in the flue gas is acceptable; however, these embodiments may not be advantageous in partial-burn units where oxygen-depletion is desired.

In full-burn regenerators there is typically enough oxygen supplied to provide substantially complete combustion of CO and have excess oxygen (usually about 0.5 to 3 mole %) remaining in the flue gas. In partial-burn regenerators, there is not enough oxygen supplied to the unit to completely combust the CO, resulting in 2 to 10 mole % CO passing with the flue gas after substantially all of the oxygen has been depleted. In either full- or partial-burn units, it is possible to have a maldistribution of dilute phase gases, resulting in the conditions in zones I and II as previously described. Either unit will benefit from mixing in the dilute phase 134 to enhance combustion in the dilute phase 134 because most of the heat capacity of the dilute phase 134 is in the entrained catalyst that will carry the heat of combustion back to the dense bed 130.

In a full-burn unit, the steam is preferably injected at a rate to sufficiently mix the gas in zone I and the gas in zone II to promote substantially complete combustion of CO to $CO_2$, preferably at least 50 mole % combustion of CO to $CO_2$, more preferably greater than 90 mole % combustion of CO to $CO_2$, and most preferably substantially complete (>99 mole %) combustion of CO to $CO_2$. At least 0.01 mole %, more preferably at least 0.5 mole % excess $O_2$ may remain in the combustion product gas. These same conditions hold true for full-burn units wherein an oxygen-containing gas is injected only into the zone wherein combustion is oxygen-limited (zone II in FIG. 2).

In a partial-burn unit, the steam is injected at a rate to sufficiently mix the gas in zone I and the gas in zone II to promote substantially complete consumption/depletion of $O_2$, preferably at least 50 mole % depletion of $O_2$, more preferably greater than 90 mole % depletion of $O_2$, and most preferably substantially complete (>99 mole %) depletion of all free $O_2$. At least 0.5 mole %, more preferably at least about 2 mole %, and more preferably about 2 to about 10 mole %, excess CO may remain in the combustion product gas.

The steam is preferably injected radially inward at a location far enough above the catalyst bed 130 so that the injection of the steam will not disturb the catalyst bed 130 and cause additional catalyst to enter the dilute phase 134. The inlets 200 are positioned between the upper level 132 of the catalyst bed (above weir 121) and the dilute phase inlets 161 to the primary cyclone(s) 155. Preferably, the inlets 200 are located at least three feet above the upper level 132 of the catalyst bed 130, and more preferably between three and nine feet above the upper level 132 of the catalyst bed 130. When two or more injectors are used, they may or may not be positioned at the same height above the catalyst bed 130. This positioning of the injectors allows most of the heat of combustion to preferably be imparted to the entrained solids in the dilute phase 134 that will eventually carry this heat back to the catalyst bed 130. The injectors are preferably positioned to inject the steam substantially radially inward, though other configurations, such as tangential injection or combinations of injector configurations, may also be used, consistent with the objectives of substantially mixing the dilute phase 134 to promote CO combustion. For example, tangential injection may be preferred when the spent catalyst enters the regenerator tangentially. The choice of injector configuration(s) is within the skill of one of ordinary skill in the art and may depend on the dilute phase flow characteristics observed in a particular unit. It may also be desirable angle the injectors slightly upward to minimize the possibility of disturbing the catalyst bed. The velocity of the steam exiting the injectors is preferably subsonic, more preferably between 100 and 700 feet per second, and even more preferably between 300 and 500 feet per second.

The rate of steam passed to the dilute phase 134 can be adjusted online, as required, to meet the operating objectives of the unit. To control the rate of steam, the operator will monitor the maximum temperature in the cyclone outlets and the plenum 158, relative to the temperature of the dense bed 130, and will adjust the flow rate of steam to moderate the maximum temperature to less than 90° F. (50° C.) higher than the dense bed temperature, preferably to less than 45° F. (25° C.) above the dense bed temperature, more preferably to less than 18° F. (10° C.) and most preferably to less than 9° F. (5° C.) above the dense bed temperature.

The construction of the regeneration zone equipment described herein can be made with any material sufficiently able to withstand the relatively high temperatures involved if afterburning is encountered within the vessel and the high attrition conditions that are inherent in systems wherein fluidized catalyst is regenerated and transported. Various items such as valves, pumps, compressors, steam lines, instrumentation and other process equipment and control means have been omitted from the Figures for the sake of simplicity.

While the invention has been described in connection with specific embodiments, it will be understood that this invention is capable of modification, and that this application is intended to cover any variations, uses, or adaptations of the invention, including such departures from the present disclosure as come within known or customary practice in the art to which the invention pertains.

What is claimed is:

1. A process for controlling afterburn in a catalyst regenerator of a fluidized catalytic cracking unit, said regenerator comprising a catalyst bed and a dilute phase, said dilute phase positioned above said catalyst bed and below an inlet to a solid-gas separator, said dilute phase comprising (a) a first zone comprising oxygen, wherein combustion in said first zone is fuel-limited; (b) a second zone comprising carbon monoxide, wherein combustion in said second zone is oxygen-limited, said process comprising the step of injecting an effective amount of steam into said dilute phase to substantially mix said gases from said first zone and said second zone so that a substantial portion of the carbon monoxide combusts before passing through the inlet to the solid-gas separator.

2. The process according to claim 1 wherein said secondary gas is radially injected into said dilute phase.

3. The process according to claim 1 wherein said secondary gas is tangentially injected into said dilute phase.

4. The process according to claim 1 wherein an oxygen-containing gas is also injected into said dilute phase in an amount sufficient to enhance combustion of CO.

5. The process according to claim 1 wherein said steam is injected into said first zone, said second zone, or both.

6. The process according to claim 1 wherein said steam is injected into said dilute phase at a position at least about 3 feet above an upper level of said catalyst bed.

7. The process according to claim 1 wherein said steam is injected into said dilute phase at a position between about 3 and about 9 feet above the upper level of said catalyst bed.

8. The process according to claim 1 wherein at least about 50 mole % of the carbon monoxide combusts before passing through the inlet to the solid-gas separator.

9. The process according to claim 1 wherein at least about 90 mole % of the carbon monoxide combusts before passing through the inlet to the solid-gas separator.

10. The process according to claim 1 wherein the first zone is positioned above a regenerated catalyst outlet of the regenerator.

11. The process according to claim 1 wherein the second zone is positioned above a spent catalyst inlet to the regenerator.

12. A process for regenerating spent catalyst from the reaction zone of a fluidized catalytic cracking reactor comprising the steps of:

(a) passing spent catalyst from the reaction zone of a fluid catalytic cracking reactor to a regenerator, said regenerator having therein a fluidized catalyst bed and a dilute phase zone above said catalyst bed, said dilute phase zone comprising the gases carbon monoxide and oxygen;

(b) contacting the spent catalyst with a gas comprising oxygen to produce a regenerated catalyst;

(c) passing said regenerated catalyst to the reaction zone; and, (d) injecting an effective amount of steam to mix the gases present in the dilute phase zone so that a substantial portion of the carbon monoxide present in the dilute phase zone combusts.

13. The process according to claim 12 wherein said secondary gas is radially injected into said dilute phase.

14. The process according to claim 12 wherein said secondary gas is tangentially injected into said dilute phase.

15. The process according to claim 12 wherein an oxygen-containing gas is also injected into said dilute phase along with said steam.

16. The process according to claim 12 wherein said steam is injected into said first zone, said second zone, or both.

17. The process according to claim 12 wherein said steam is injected into said dilute phase at a position at least about 3 feet above an upper level of said catalyst bed.

18. The process according to claim 12 wherein said steam is injected into said dilute phase at a position between about 3 and about 9 feet above the upper level of said catalyst bed.

19. The process according to claim 12 wherein at least about 50 mole % of the carbon monoxide combusts before passing through the inlet to the solid-gas separator.

20. The process according to claim 12 wherein at least about 90 mole % of the carbon monoxide combusts before passing through the inlet to the solid-gas separator.

21. A process for controlling afterburn in a catalyst regenerator of a fluidized catalytic cracking unit, said regenerator adapted to operate under partial burn conditions, said regenerator comprising a catalyst bed and a dilute phase, said dilute phase positioned above said catalyst bed and below an inlet to a solid-gas separator, said dilute phase comprising (a) a first zone comprising oxygen, wherein combustion in said first zone is fuel-limited; (b) a second zone comprising carbon monoxide, wherein combustion in said second zone is oxygen-limited, said process comprising the step of using steam to substantially mix said gases from said first zone and said second zone so that a substantial portion of the oxygen present in said dilute phase reacts with carbon monoxide before passing through the inlet to the solid-gas separator.

22. The process according to claim 21 wherein at least about 90 mole % of the oxygen reacts with carbon monoxide before passing through the inlet to the solid-gas separator.

23. The process according to claim 21 wherein at least about 2 mole % CO remains uncombusted.

24. The process according to claim 21 wherein about 2 to about 10 mole % CO remains uncombusted.

* * * * *